US006884204B2

(12) United States Patent
Watanabe

(10) Patent No.: US 6,884,204 B2
(45) Date of Patent: Apr. 26, 2005

(54) MACHINE TOOL

(75) Inventor: Noboru Watanabe, Nagaoka (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 10/644,788

(22) Filed: Aug. 21, 2003

(65) Prior Publication Data
US 2004/0038787 A1 Feb. 26, 2004

(30) Foreign Application Priority Data
Aug. 26, 2002 (JP) ........................................ 2002-244589

(51) Int. Cl.⁷ ............................................. B23Q 3/157
(52) U.S. Cl. ....................... 483/12; 409/234; 409/232; 409/133; 409/188; 29/568
(58) Field of Search ................................. 409/133, 186, 409/188, 193, 195, 207, 210, 214, 218, 220; 483/7, 12, 13; 451/9; 33/561, 632, 638, 640

(56) References Cited

U.S. PATENT DOCUMENTS

| | | | | |
|---|---|---|---|---|
| 3,916,739 A | * | 11/1975 | Nomura | 82/158 |
| 4,118,871 A | * | 10/1978 | Kirkham | 33/505 |
| 4,404,774 A | * | 9/1983 | Sadao | 451/15 |
| 4,641,415 A | * | 2/1987 | Charra | 483/13 |
| 4,745,674 A | * | 5/1988 | Abe et al. | 483/13 |
| 4,774,753 A | * | 10/1988 | Holy et al. | 483/13 |
| 4,930,957 A | * | 6/1990 | Priessnitz | 409/234 |
| 4,976,177 A | * | 12/1990 | Fouche | 82/147 |
| 5,065,035 A | * | 11/1991 | Juengel | 33/561 |
| 5,313,694 A | * | 5/1994 | Yonemoto et al. | 29/27 R |
| 6,131,301 A | * | 10/2000 | Sutherland | 33/561 |
| 6,612,791 B1 | * | 9/2003 | Haimer | 409/232 |
| 6,644,637 B1 | * | 11/2003 | Shen et al. | 269/152 |

FOREIGN PATENT DOCUMENTS

| | | | | | |
|---|---|---|---|---|---|
| JP | 55065030 A | * | 5/1980 | | B23F/23/04 |
| JP | 57075734 A | * | 5/1982 | | B23P/1/12 |
| JP | 4-130137 | | 11/1992 | | |
| JP | 6-39683 | | 2/1994 | | |
| JP | 10-43985 | | 2/1998 | | |
| JP | 10071517 A | * | 3/1998 | | B23B/51/04 |
| JP | 2000000706 A | * | 1/2000 | | B23B/31/19 |
| JP | 2002292544 A | * | 10/2002 | | B23Q/17/22 |

* cited by examiner

Primary Examiner—Erica Cadugan
Assistant Examiner—Dana Ross
(74) Attorney, Agent, or Firm—Westerman, Hattori, Daniels & Adrian, LLP

(57) ABSTRACT

A machine tool comprises: a workpiece spindle (12) having an electromagnetic chuck (18) provided on an upper end thereof for clamping a workpiece (W), and extending along the Z-axis; a tool magazine which accommodates a tool (T) and a centering jig (20); an automatic tool changer (17) for exchanging the tool (T) between the tool magazine and a tool spindle; and a run-out measuring device (19) for measuring a run-out of the workpiece (W) placed on the electromagnetic chuck (18); wherein a workpiece correction distance is calculated on the basis of the run-out of the workpiece (W) measured by the run-out measuring device (19) before the workpiece (W) is clamped by the electromagnetic chuck (18), and a workpiece centering operation is automatically performed by the centering jig (20) attached to the tool spindle until the run-out of the workpiece (W) falls within an allowable range.

2 Claims, 3 Drawing Sheets

MACHINE TOOL

BACKGROUND OF THE INVENTION

1. Field of the Invention

The present invention relates to a machine tool which is adapted to fix a workpiece to a workpiece spindle by non-self-aligning clamp means such as a magnetic chuck or a face-clamp and, particularly, to a machine tool having an automatic workpiece centering function.

2. Description of Related Art

In a machine tool such as a CNC vertical grinder having a vertical workpiece spindle for rotating a workpiece, for example, a magnetic chuck for clamping the workpiece by utilizing an attractive force of an electromagnet is provided on an upper end of the workpiece spindle. The workpiece is machined, while the workpiece spindle is rotated with the workpiece being clamped by the magnetic chuck.

Meanwhile, a mechanical chuck including a plurality of chuck claws movable radially inwardly and outwardly of the workpiece spindle for clamping the workpiece has a self-aligning function such that the center of the workpiece is naturally aligned with the rotation center of the workpiece spindle when the workpiece is clamped. On the contrary, the aforesaid magnetic chuck is merely adapted to hold the workpiece placed directly on a horizontal surface thereof or with the intervention of a chuck block by the attractive force of the electromagnet and, hence, has no self-aligning function unlike the mechanical chuck.

In the case of the machine tool including the non-self-aligning magnetic chuck for clamping the workpiece, the center of the workpiece should be aligned with the rotation center of the workpiece spindle before the workpiece placed on the magnetic chuck is clamped. Therefore, an operator manually performs a workpiece centering operation whenever the workpiece is mounted on the machine tool.

The workpiece centering operation is performed by rotating the workpiece spindle with the workpiece being placed on the magnetic chuck, bringing a dial gage or the like into contact with an outer circumferential surface of the workpiece for measuring a run-out of the workpiece resulting from off-center of the workpiece, and repeatedly correcting the position of the workpiece to minimize the run-out. This requires great effort and time, thereby imposing a great burden on the operator in a preparatory operation. In addition, the machining of the workpiece cannot efficiently be performed in a short time.

It is therefore an object of the present invention to provide a machine tool which is capable of efficiently machining a workpiece in a short time while minimizing the burden on the operator even if non-self-aligning clamp means is employed for clamping the workpiece.

SUMMARY OF THE INVENTION

According to a first aspect of the present invention, there is provided a machine tool adapted to fix a workpiece on a workpiece spindle by non-self-aligning clamp means, the machine tool comprising: a centering jig to be attached to a tool spindle; and a run-out measuring device for measuring a run-out of the workpiece resulting from off-center of the workpiece mounted on the workpiece spindle; wherein, when the workpiece is to be fixed to the workpiece spindle by the clamp means, the centering jig is attached to the tool spindle, and the tool spindle is moved on the basis of the run-out of the workpiece measured by the run-out measuring device to center the workpiece by the centering jig.

With this arrangement, when the workpiece is to be fixed to the workpiece spindle in the machine tool, the centering jig is taken out of a tool magazine and attached to the tool spindle, and the workpiece is automatically centered by the centering jig by moving the tool spindle on the basis of the run-out of the workpiece measured by the run-out measuring device. Therefore, the operator does not have to manually perform the troublesome workpiece centering operation, which is required in the case of the conventional machine tool, whenever the workpiece is mounted on the workpiece spindle. This alleviates the burden on the operator.

According to a second aspect of the present invention, there is provided a machine tool adapted to fix a workpiece to a workpiece spindle by non-self-aligning clamp means, the machine tool comprising: a tool magazine which accommodates a plurality of tools; an automatic tool changer for exchanging a tool between the tool magazine and a tool spindle; and a run-out measuring device for measuring a run-out of the workpiece resulting from off-center of the workpiece mounted on the workpiece spindle; wherein a centering jig to be attached to the tool spindle is accommodated in the tool magazine; wherein, when the workpiece is to be fixed to the workpiece spindle by the clamp means, the centering jig is taken out of the tool magazine and attached to the tool spindle by the automatic tool changer, and the tool spindle is moved on the basis of the run-out of the workpiece measured by the run-out measuring device to center the workpiece by the centering jig. With this arrangement, a process sequence from the mounting of the workpiece to the machining of the workpiece can sequentially be performed. Hence, the workpiece can efficiently be machined in a short time.

The foregoing and other objects, features and effects of the present invention will become more apparent from the following description of the preferred embodiment with reference to the attached drawings.

DESCRIPTION OF THE PREFERRED EMBODIMENT

Figure 1:
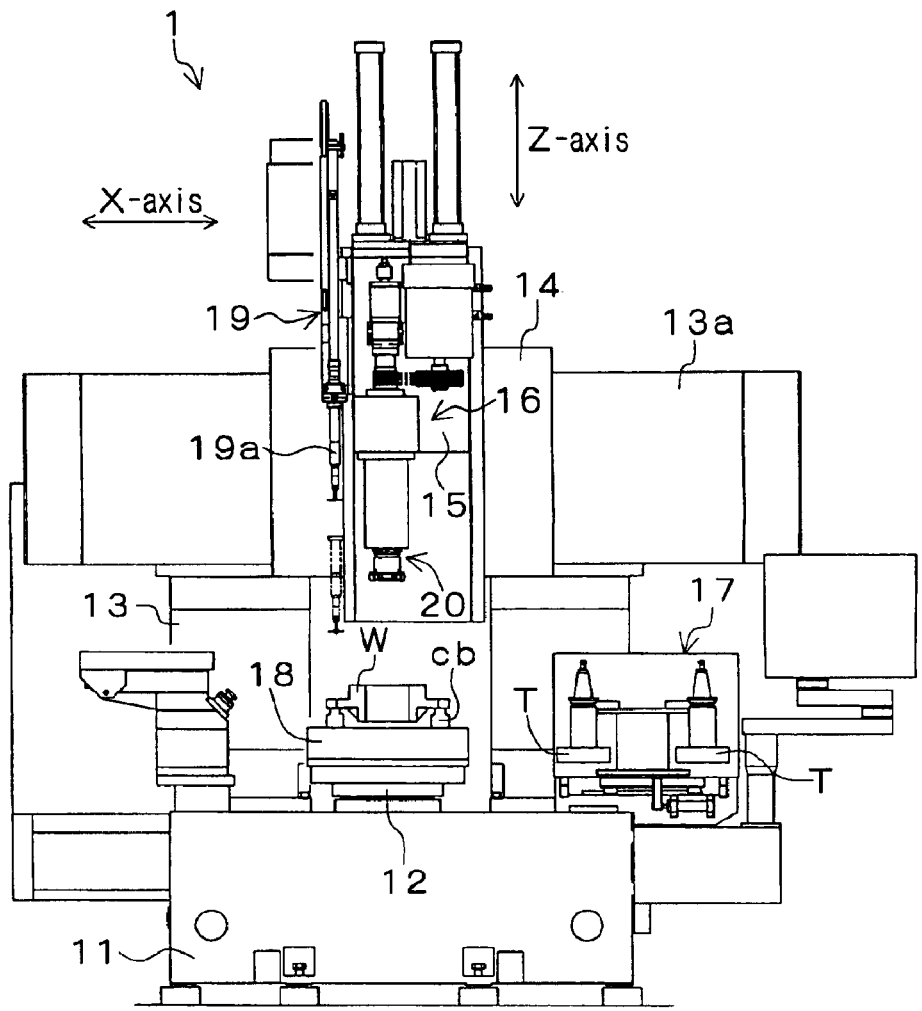
FIG. 1 is a front view illustrating a vertical grinder as a machine tool according to the present invention.

An embodiment of the present invention will hereinafter be described with reference to the attached drawings. As shown in FIG. 1, the vertical grinder 1 includes a bed 11, a workpiece spindle 12 provided on the bed 11 as extending vertically (along the Z-axis) a column 13 provided upright on a rear portion of the bed 11, a slide member 14 slidable laterally (along the X-axis) on a slideway 13a provided on the column 13, a tool spindle head 16 provided on a support base 15 movable vertically (along the Z-axis) on a slideway provided on a front face of the slide member 14, and an armless automatic tool changer 17 for automatically exchanging a tool T between a tool spindle and a tool magazine which accommodates a plurality of tools (grinding wheels) to be attached to the tool spindle. A non-self-aligning electromagnetic chuck 18 for clamping a workpiece W is provided on an upper end of the workpiece spindle 12.

A run-out measuring device 19 having a detector 19a movable vertically up and down (along the Z-axis) for measuring a run-out of the workpiece resulting from off-center of the workpiece W placed on the electromagnetic chuck 18 is provided on the support base 15 of the tool spindle head 16. The run-out measuring device 19 is movable together with the tool spindle head 16 laterally (along the X-axis) and vertically (along the Z-axis).

Figure 2:
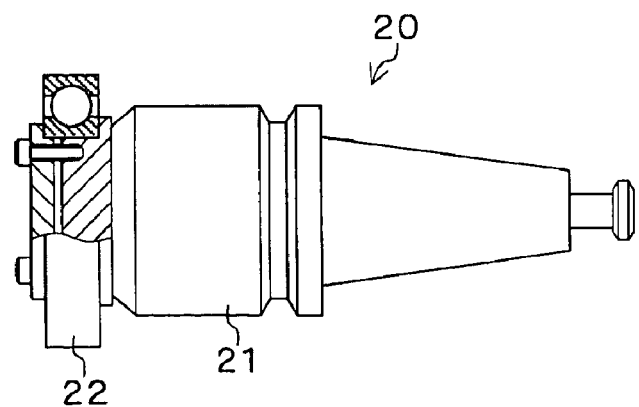
FIG. 2 is a side view illustrating a centering jig to be attached to a tool spindle of the vertical grinder.

In addition to the tools T, a centering jig 20 (see FIG. 2) having a quill 21 attached to a bearing 22 for centering the workpiece W placed on the electromagnetic chuck 18 is accommodated in the tool magazine. Like the tools T, the centering jig 20 is automatically attached to the tool spindle by the automatic tool changer 17.

Figure 3A:
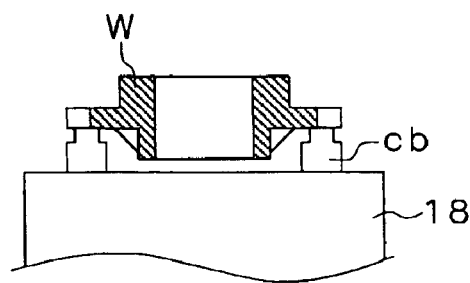
FIGS. 3A to 3E are diagrams for explaining the operation of the vertical grinder.

The operation of the vertical grinder 1 having the aforesaid construction will hereinafter be described with reference to explanatory diagrams in FIGS. 3A to 3E and a flow chart in FIG. 4. As shown in FIG. 3A, the workpiece W is placed on the electromagnetic chuck 18 with the intervention of a chuck block cb by an operator or a robot (Step S1). When a machining start command is outputted (Step S2), the centering jig 20 is taken out of the tool magazine and attached to the tool spindle by the automatic tool changer 17 (Step S3). At this time, the electromagnetic chuck 18 does not clamp the workpiece W, so that the workpiece W can freely be moved on the electromagnetic chuck 18.

Figure 3B:
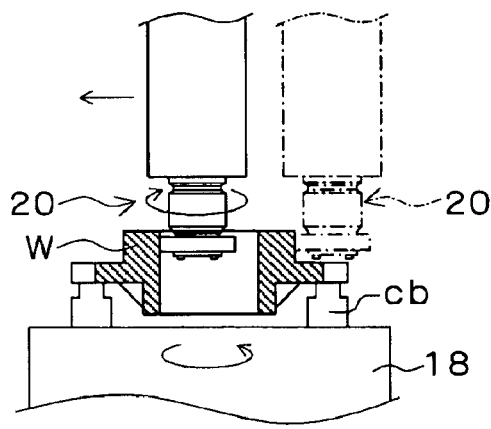
Figure 4:
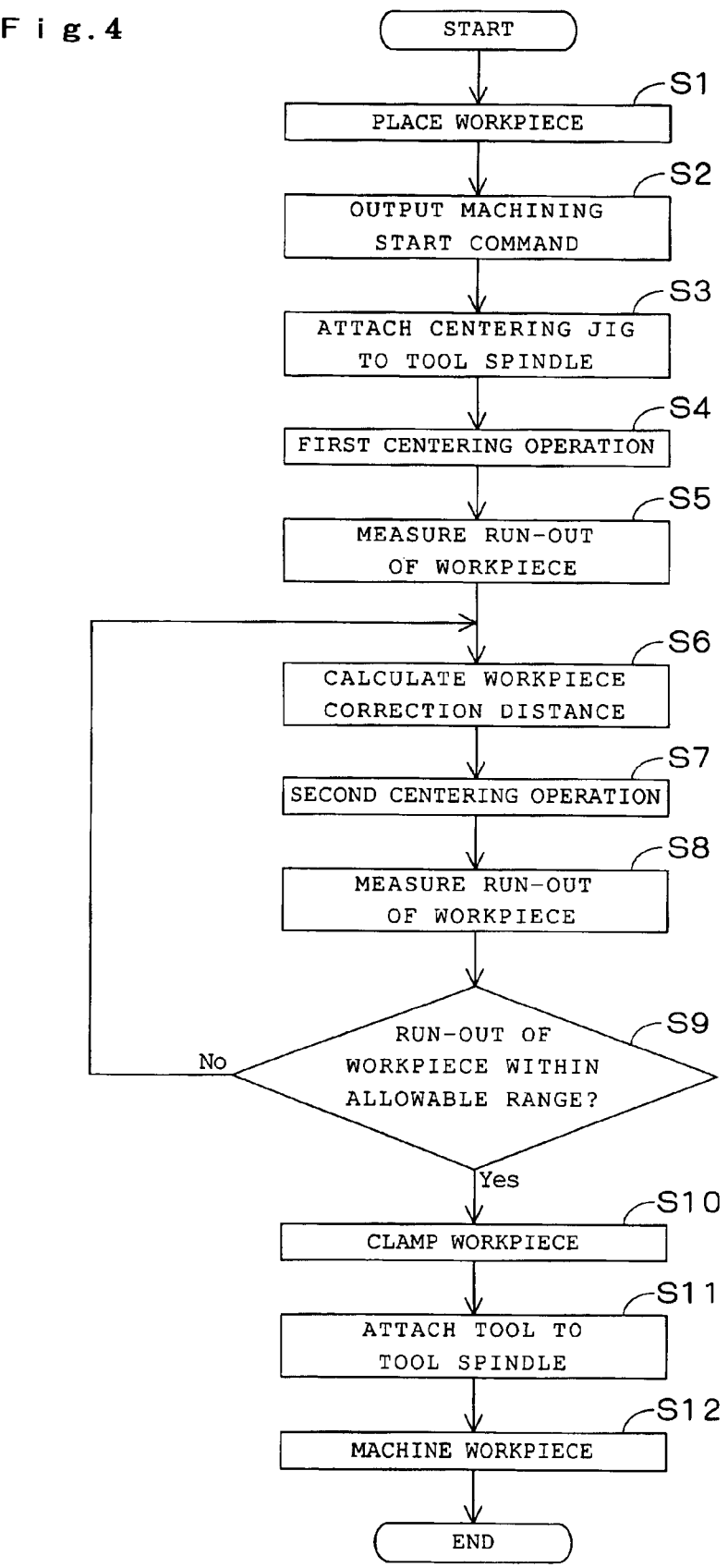
FIG. 4 is a flow chart for explaining the operation of the vertical grinder.

In turn, low-speed rotation of the workpiece spindle and rotation of the tool spindle are started, and a first centering operation is performed for moving the workpiece W by a predetermined movement distance by pressing the bearing 22 of the centering jig 20 attached to the tool spindle against an outer or inner circumferential surface of the workpiece W rotated at a low speed together with the electromagnetic chuck 18 as shown in FIG. 3B (Step S4). The movement distance of the workpiece W in the first centering operation is determined in consideration of a maximum variation in off-center of the workpiece W placed on the electromagnetic chuck 18 by the operator or the robot and a minimum variation in machining dimension of a workpiece W machined in the previous machining operation.

Figure 3C:
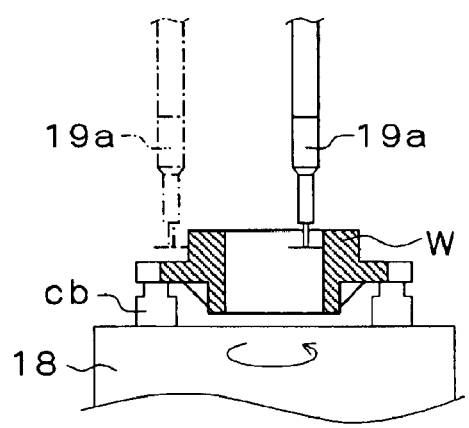

Upon completion of the first centering operation, the centering jig 20 is moved apart from the workpiece W, and the detector 19a of the run-out measuring device 19 is lowered as shown in FIG. 3C. While the workpiece spindle is rotated at a low speed, the detector 19a of the run-out measuring device 19 is brought into contact with the outer or inner circumferential surface of the workpiece W (the surface kept in contact with the centering jig 20 in the first centering operation). Thus, a run-out Va of the workpiece W after the first centering operation is measured (Step S5). On the basis of the run-out Va of the workpiece W thus measured, a workpiece correction distance AL (=Va/2−α) is calculated (Step S6). In the equation for the calculation of the correction distance AL, α is a maximum circularity expected from preliminary machining of the workpiece W, and the correction distance AL is determined by subtracting α from Va/2 for prevention of excessive feed for the centering.

Figure 3D:
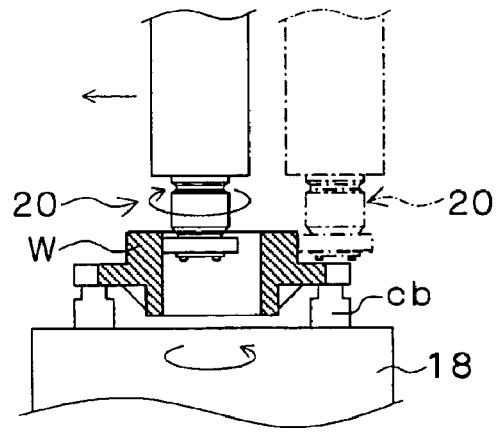
Figure 3E:
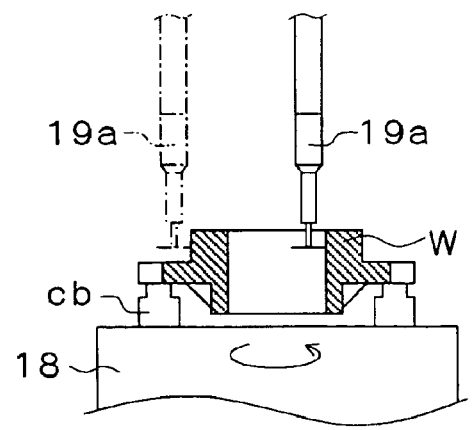

Then, the detector 19a of the run-out measuring device 19 is moved apart from the workpiece W and lifted. While the tool spindle is rotated, a second centering operation is performed for moving the workpiece W by the correction distance AL calculated in Step S6 by properly pressing the bearing 22 of the centering jig 20 against the outer or inner circumferential surface of the workpiece W (the surface kept in contact with the centering jig 20 in the first centering operation) as shown in FIG. 3D (Step S7). Then, a run-out Va of the outer or inner circumferential surface of the workpiece W (the surface kept in contact with the detector 19a during the measurement of the run-out after the first centering operation) is measured again by the run-out measuring device 19 as shown in FIG. 3E (Step S8).

It is judged whether the run-out Va of the workpiece W measured after the second centering operation is within an allowable range preliminarily determined for each workpiece W (Step S9). If the run-out Va of the workpiece W is within the allowable range, the centering operation ends, and the workpiece W is clamped by the electromagnetic chuck 18 (Step S10). Further, the centering jig 20 attached to the tool spindle is replaced with a machining tool T by the automatic tool changer 17 (Step S11), and then a workpiece grinding operation is performed (Step S12).

On the other hand, if the run-out Va of the workpiece W is out of the allowable range in Step S9, the process goes to Step S6, and a process sequence from Step S6 to Step S9 is repeated until the run-out Va of the workpiece W falls within the allowable range.

In the vertical grinder 1, as described above, the centering jig 20 is taken out of the tool magazine and attached to the tool spindle, and the workpiece correction distance AL is calculated on the basis of the run-out Va of the workpiece W measured by the run-out measuring device 19, before the workpiece W placed on the electromagnetic chuck 18 is clamped. Then, the workpiece centering operation is automatically repeatedly performed by the centering jig 20 attached to the tool spindle, until the run-out Va of the workpiece W falls within the allowable range. Therefore, the operator does not have to manually perform the troublesome workpiece centering operation, which is required in the case of the conventional machine tool, whenever the workpiece is mounted on the workpiece spindle. Further, a process sequence from the mounting of the workpiece to the machining of the workpiece can sequentially be performed. Hence, the workpiece can efficiently be machined in a short time.

In the embodiment described above, the workpiece W is moved by the movement distance predetermined for each workpiece W in the first centering operation. However, the present invention is not limited to this arrangement, but the movement of the workpiece W in the first centering operation may be achieved, for example, by once measuring a run-out Va of the workpiece W by the run-out measuring device 19 immediately after the workpiece W is placed on the electromagnetic chuck 18, and moving the workpiece W by a correction distance AL calculated on the basis of the measured run-out Va of the workpiece W as in the second centering operation.

In the embodiment described above, the workpiece W is centered by the centering jig 20 attached to the tool spindle, while the tool spindle is rotated. This is intended to maintain a high level of accuracy for a long period of time. However, the present invention is not limited to this arrangement, but the centering of the workpiece W may be achieved without the rotation of the tool spindle.

The embodiment described above is directed to the vertical grinder 1 having the automatic tool changer 17 for automatically exchanging the tool T between the tool magazine and the tool spindle. However, the present invention is applicable to a vertical grinder which includes no automatic tool changer so that the operator has to manually attach a tool to a tool spindle for tool change. Like the aforesaid vertical grinder 1, this vertical grinder includes a run-out measuring device, and a centering jig is attached to the tool spindle of the vertical grinder. In the vertical grinder, a workpiece is centered by the centering jig, while the tool spindle is moved on the basis of a run-out of the workpiece measured by the run-out measuring device. When the workpiece is mounted on the workpiece spindle, the operator is merely required to attach the centering jig to the tool spindle for automatically performing the troublesome workpiece centering operation. Therefore, the burden on the operator can be alleviated.

The embodiment described above is directed to the vertical grinder 1 adapted to clamp the workpiece W by the electromagnetic chuck 18. However, the present invention is not limited to such a vertical grinder 1, but is applicable to various types of machine tools such as vertical lathes which are adapted to fix a workpiece to a workpiece spindle by non-self-aligning clamp means such as a magnetic chuck or a face-clamp.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A machine tool adapted to fix a workpiece on a workpiece spindle by non-self-aligning clamp means, the machine tool comprising:

a centering jig to be attached to a tool spindle; and a run-out measuring device mounted on the tool spindle head for measuring a run-out of the workpiece resulting from the workpiece being off-center;

wherein, when the workpiece is to be fixed to the workpiece spindle by the clamp means, the centering jig is attached to the tool spindle, and the tool spindle is moved on the basis of the run-out of the workpiece measured by the run-out measuring device to center the workpiece by the centering jig.

2. A machine tool adapted to fix a workpiece to a workpiece spindle by non-self-aligning clamp means, the machine tool comprising:

a tool magazine which accommodates a plurality of tools;

an automatic tool changer for exchanging a tool between the tool magazine and a tool spindle; and a run-out measuring device mounted on the tool spindle head for measuring a run-out of the workpiece resulting from the workpiece being off-center;

wherein a centering jig to be attached to the tool spindle is accommodated in the tool magazine;

wherein, when the workpiece is to be fixed to the workpiece spindle by the clamp means, the centering jig is taken out of the tool magazine and attached to the tool spindle by the automatic tool changer, and the tool spindle is moved on the basis of the run-out of the workpiece measured by the run-out measuring device to center the workpiece by the centering jig.

* * * * *